(12) United States Patent
Army et al.

(10) Patent No.: US 9,151,539 B2
(45) Date of Patent: Oct. 6, 2015

(54) HEAT EXCHANGER HAVING A CORE ANGLED BETWEEN TWO HEADERS

(75) Inventors: Steven D. Army, Enfield, CT (US); Donald E. Army, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1067 days.

(21) Appl. No.: 13/081,615

(22) Filed: Apr. 7, 2011

(65) Prior Publication Data
US 2012/0255715 A1 Oct. 11, 2012

(51) Int. Cl.
| | |
|---|---|
| B60H 1/00 | (2006.01) |
| F28F 9/00 | (2006.01) |
| F28D 1/00 | (2006.01) |
| F28F 3/00 | (2006.01) |
| F28D 1/053 | (2006.01) |
| B64D 13/06 | (2006.01) |
| B64D 13/08 | (2006.01) |
| F28D 1/02 | (2006.01) |

(52) U.S. Cl.
CPC ............... *F28D 1/053* (2013.01); *B64D 13/06* (2013.01); *B64D 13/08* (2013.01); *B64D 2013/0674* (2013.01); *F28D 2001/0266* (2013.01)

(58) Field of Classification Search
USPC ............ 165/41, 164, 165, 166, 167, 67, 149, 165/153
See application file for complete search history.

(56) References Cited

U.S. PATENT DOCUMENTS

| | | | | | |
|---|---|---|---|---|---|
| 2,103,947 | A | * | 12/1937 | Holmes | 165/164 |
| 2,321,110 | A | * | 6/1943 | Shipman | 165/166 |
| 2,816,740 | A | * | 12/1957 | Huet | 165/166 |
| 3,071,186 | A | * | 1/1963 | Zonker | 165/67 |
| 3,262,682 | A | * | 7/1966 | Bredberg | 261/29 |
| 3,311,166 | A | * | 3/1967 | Southam | 165/166 |
| 3,353,802 | A | * | 11/1967 | Reaney | 261/110 |
| 3,590,917 | A | * | 7/1971 | Huber et al. | 165/166 |
| 3,638,719 | A | * | 2/1972 | McGann | 165/164 |
| 3,847,211 | A | * | 11/1974 | Fischel et al. | 165/166 |
| 3,893,509 | A | * | 7/1975 | Satchwell et al. | 165/166 |
| 3,983,933 | A | * | 10/1976 | Fletcher et al. | 165/164 |
| 4,044,825 | A | * | 8/1977 | Gugenberger et al. | 165/165 |
| 4,071,935 | A | * | 2/1978 | Molitor | 165/164 |
| 4,089,188 | A | * | 5/1978 | Van Laeys | 62/290 |
| 4,096,910 | A | * | 6/1978 | Coffinberry et al. | 165/164 |
| 4,124,069 | A | * | 11/1978 | Becker | 165/164 |
| 4,125,153 | A | * | 11/1978 | Stoneberg | 165/166 |

(Continued)

FOREIGN PATENT DOCUMENTS

EP 1604899 A2 12/2005

OTHER PUBLICATIONS

European Patent Office, European Search Report, Jan. 16, 2015, 6 pages.

*Primary Examiner* — Ljiljana Ciric
(74) *Attorney, Agent, or Firm* — Kinney & Lange, P.A.

(57) ABSTRACT

A liquid-to-air heat exchanger includes an air inlet header, an air outlet header, and a core. The air inlet header has an air inlet connection and the air outlet header has an air outlet connection. The core is connected to the air inlet header and the air outlet header. The core is angled relative to the air inlet connection and the air outlet connection. The air inlet connection and air outlet connection do not align in a straight flow path. The core is disposed at an acute angle relative to one of the air inlet connection and the air outlet connection and is disposed at an obtuse angle relative to the other of the air inlet connection and the air outlet connection.

6 Claims, 3 Drawing Sheets

(56) References Cited

U.S. PATENT DOCUMENTS

| | | | |
|---|---|---|---|
| 4,187,090 A | 2/1980 | Bizzarro et al. | |
| 4,234,040 A * | 11/1980 | Argyle et al. | 165/164 |
| 4,248,209 A * | 2/1981 | Wasserman | 165/164 |
| 4,266,601 A * | 5/1981 | Jenkins | 165/164 |
| 4,319,630 A * | 3/1982 | Hronek et al. | 165/164 |
| 4,402,361 A * | 9/1983 | Dominguez | 165/164 |
| 4,484,621 A * | 11/1984 | Kuchelmeister | 165/67 |
| 4,503,902 A * | 3/1985 | Zolik | 165/164 |
| 4,540,045 A * | 9/1985 | Molitor | 165/164 |
| 4,559,999 A * | 12/1985 | Servas et al. | 165/164 |
| 4,577,683 A * | 3/1986 | Kelch | 165/164 |
| 4,579,163 A * | 4/1986 | Maendel | 165/166 |
| 4,599,859 A * | 7/1986 | Urso | 165/164 |
| 4,612,086 A * | 9/1986 | Dominguez | 165/164 |
| 4,612,981 A * | 9/1986 | Palz et al. | 165/158 |
| 4,681,610 A | 7/1987 | Warner | |
| 4,793,407 A * | 12/1988 | Baumann | 165/165 |
| 4,883,117 A * | 11/1989 | Dobbs et al. | 165/164 |
| 4,889,181 A * | 12/1989 | Meijer | 165/164 |
| 4,934,454 A * | 6/1990 | Vandyke et al. | 165/165 |
| 5,029,640 A * | 7/1991 | Niggemann | 165/164 |
| 5,062,411 A * | 11/1991 | Karabin et al. | 165/164 |
| 5,072,784 A * | 12/1991 | Stenlund | 165/164 |
| 5,101,894 A * | 4/1992 | Hendricks | 165/164 |
| 5,102,533 A * | 4/1992 | Oshiyama | 165/70 |
| RE33,912 E | 5/1992 | Lapkowski | 165/166 |
| 5,154,051 A * | 10/1992 | Mouritzen | 165/164 |
| 5,273,106 A * | 12/1993 | Drake | 165/164 |
| 5,289,873 A * | 3/1994 | Ryan et al. | 165/149 |
| 5,394,937 A * | 3/1995 | Nieh | 165/164 |
| 5,421,405 A * | 6/1995 | Goodin et al. | 165/164 |
| 5,469,914 A * | 11/1995 | Davison et al. | 165/166 |
| 5,709,264 A * | 1/1998 | Sweeney et al. | 165/166 |
| 5,782,225 A * | 7/1998 | Caggiano | 165/164 |
| 5,785,117 A * | 7/1998 | Grinbergs | 165/166 |
| 5,800,582 A | 9/1998 | Palmer et al. | |
| 5,832,992 A * | 11/1998 | Van Andel | 165/164 |
| 5,913,360 A * | 6/1999 | Stark | 165/166 |
| 5,915,469 A * | 6/1999 | Abramzon et al. | 165/166 |
| 5,944,094 A * | 8/1999 | Kinney et al. | 165/166 |
| 5,947,195 A | 9/1999 | Sasaki | |
| 6,076,598 A * | 6/2000 | Doi et al. | 165/166 |
| 6,223,808 B1 * | 5/2001 | Tsunoda et al. | 165/164 |
| 6,338,258 B1 * | 1/2002 | Lee et al. | 62/121 |
| 6,340,052 B1 * | 1/2002 | Uehara | 165/166 |
| 6,364,007 B1 * | 4/2002 | Fischer | 165/166 |
| 6,449,963 B1 | 9/2002 | Ng et al. | |
| 6,516,874 B2 * | 2/2003 | Mathur et al. | 165/166 |
| 6,524,373 B2 | 2/2003 | Afeiche et al. | |
| 6,672,375 B1 * | 1/2004 | Shippy et al. | 165/151 |
| 6,675,921 B2 * | 1/2004 | Brown | 165/67 |
| 6,715,713 B2 * | 4/2004 | Marche | 165/41 |
| 6,736,200 B2 * | 5/2004 | Okazaki et al. | 165/164 |
| 6,845,629 B1 * | 1/2005 | Bourne et al. | 165/166 |
| 6,854,278 B2 * | 2/2005 | Maisotsenko et al. | 62/94 |
| 6,883,335 B2 | 4/2005 | Axe et al. | |
| 7,266,958 B2 | 9/2007 | Milde et al. | |
| 7,591,869 B2 | 9/2009 | Jensen et al. | |
| 7,691,185 B2 | 4/2010 | Darke et al. | |
| 7,891,415 B2 * | 2/2011 | Ushio et al. | 165/164 |
| 8,047,272 B2 * | 11/2011 | Whittenberger et al. | 165/164 |
| 8,376,036 B2 * | 2/2013 | Kammerzell | 165/166 |
| 8,651,170 B2 * | 2/2014 | Maeda et al. | 165/166 |
| 8,770,269 B2 * | 7/2014 | Scott | 165/164 |
| 8,789,766 B2 * | 7/2014 | Baldauf | 165/202 |
| 8,794,303 B2 * | 8/2014 | Yamada | 165/167 |
| 8,925,624 B2 * | 1/2015 | Kuroyanagi et al. | 165/166 |
| 8,967,238 B2 * | 3/2015 | Meschke et al. | 165/166 |
| 2004/0031599 A1 * | 2/2004 | Wilson | 165/166 |
| 2009/0017742 A1 | 1/2009 | Diaks | |
| 2010/0071638 A1 | 3/2010 | Bulin | |
| 2010/0323601 A1 | 12/2010 | Cremers et al. | |

* cited by examiner

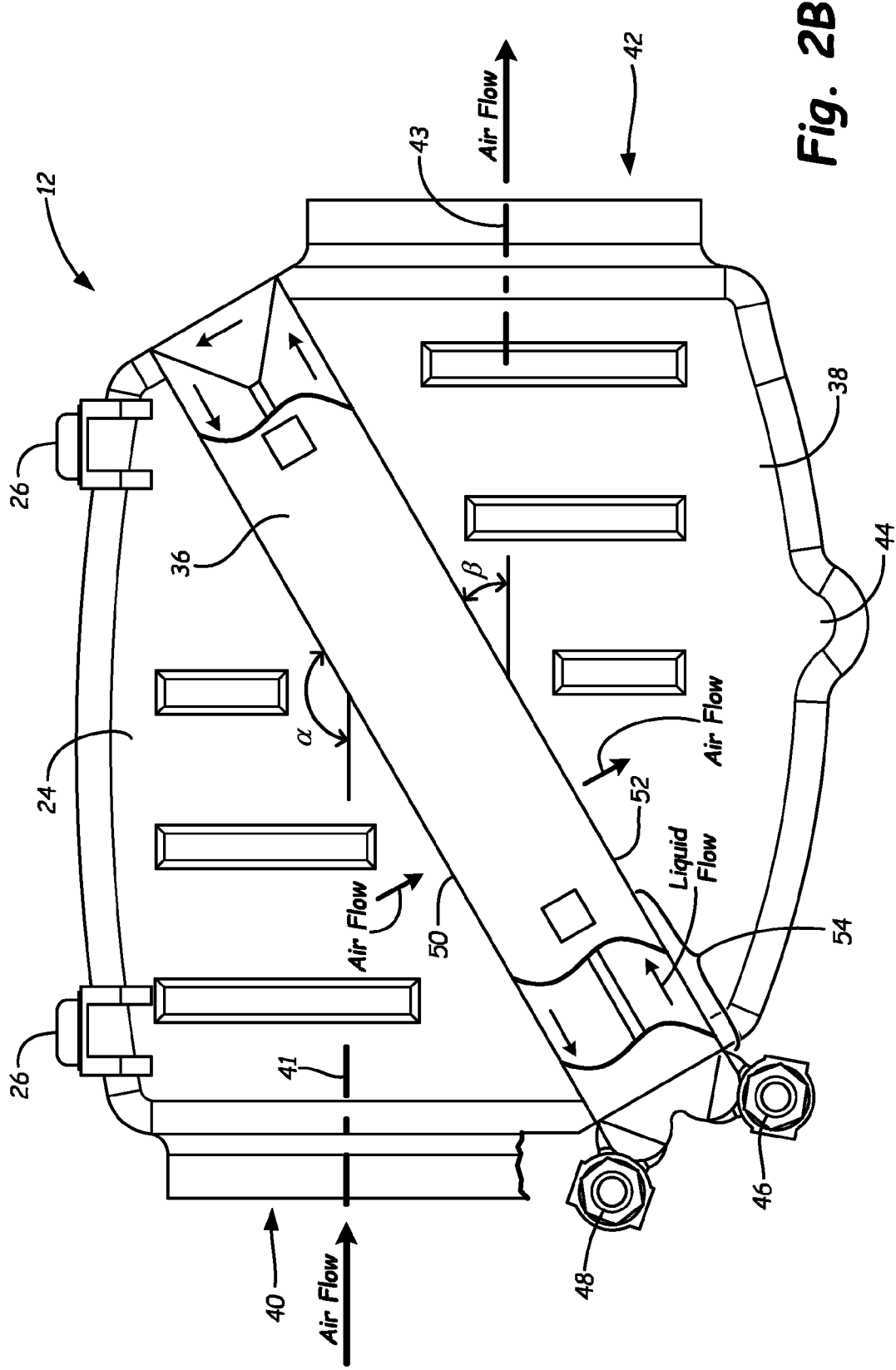

HEAT EXCHANGER HAVING A CORE ANGLED BETWEEN TWO HEADERS

BACKGROUND

The present disclosure relates generally to air conditioning systems, and more specifically to heat exchangers for cooling air in an aircraft.

Aircraft cabins require a constant flow of conditioned air during operation. Aircraft typically include air cycle systems that provide conditioned air to the cockpit and cabin. Air cycle systems include an air-to-air heat exchanger typically installed outside the aircraft pressure vessel. In such a position, the heat exchanger does not communicate directly with an air distribution ducting system that is located in the crown of the aircraft above the cabin. This air distribution ducting system delivers conditioned air along the length of the cabin.

SUMMARY

A liquid-to-air heat exchanger includes an air inlet header, an air outlet header and a core. The air inlet header has an air inlet connection and the air outlet header has an air outlet connection. The core is connected to the air inlet header and the air outlet header and is angled relative to the air inlet connection and the air outlet connection. More particularly, the air inlet connection and air outlet connection do not align in a straight flow path and the core is disposed at an acute angle relative to one of the air inlet connection and the air outlet connection and an obtuse angle relative to the other of the air inlet connection and the air outlet connection.

In another aspect, an air cooling system for an aircraft cabin includes a liquid-to-air heat exchanger, an inlet duct, and an outlet duct. The heat exchanger has an air inlet header that forms an air inlet connection and an air outlet header that forms an air outlet connection therefrom. The heat exchanger has a core disposed at an angle to the air inlet connection and the air outlet connection. The inlet duct is disposed in fluid communication with the air inlet connection and is configured to direct warmer air from the cabin into the heat exchanger. Similarly, the outlet duct is disposed in fluid communication with the air outlet connection and is configured to direct cooled conditioned air out of the heat exchanger and back to the cabin.

BRIEF DESCRIPTION OF THE DRAWINGS

FIG. 2B is a side view of the heat exchanger of FIG. 2A.

DETAILED DESCRIPTION

Figure 1:
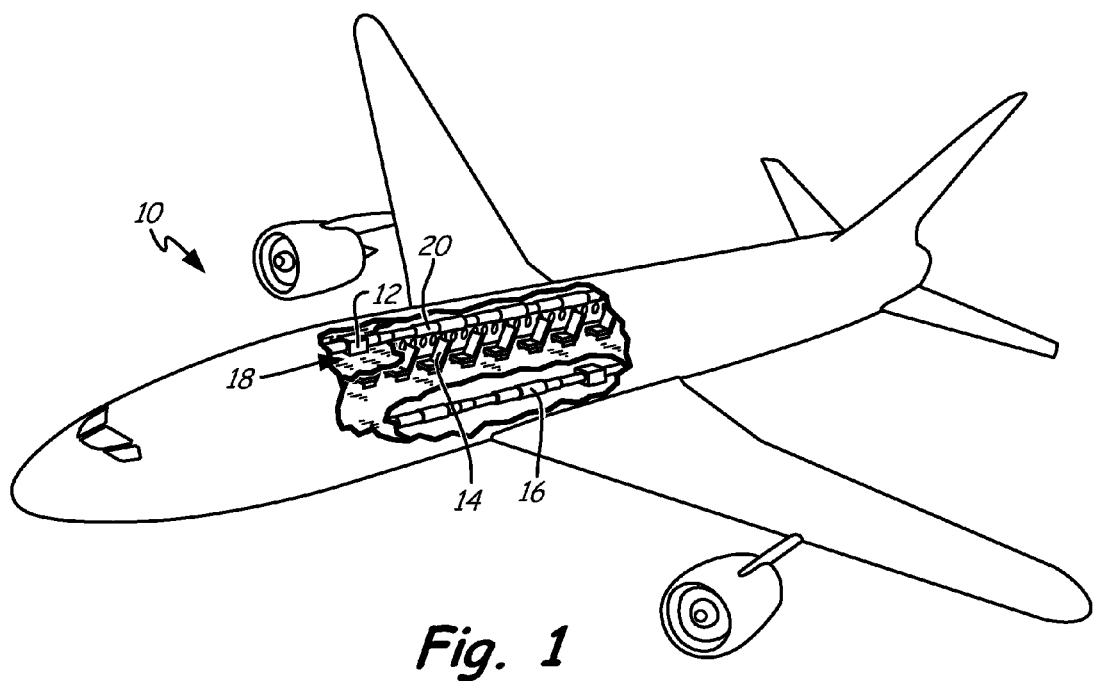
FIG. 1 is a cut-away view of an aircraft having a heat exchanger and ducting disposed in a crown thereof.

FIG. 1 is a cut-away view of aircraft 10 having a liquid-to-air heat exchanger 12. Aircraft 10 includes passenger cabin 14. Located below a floor of cabin 14 is lower ducting 16, and located above a ceiling of cabin 14 in crown 18 is upper ducting 20, which is disposed in communication with heat exchanger 12. Air from cabin 14 is drawn into upper ducting 20 in crown 18 for cooling by heat exchanger 12 before being returned to cabin 14.

As shown in FIG. 1, aircraft 10 has cabin 14 for transporting passengers. Cabin 14 is defined at the bottom by the floor and at a top by the ceiling. Lower ducting 16 is located below the floor while upper ducting 20 is located above the ceiling in crown 18. Heat exchanger 12 is attached to upper ducting 20 and is also located in crown 18 of aircraft 10.

Used cabin air is drawn from a bottom of cabin 14 through the floor and into lower ducting 16. This portion of used cabin air is ducted through lower ducting 16 to an unpressurized region of aircraft 10 for mixing with fresh, conditioned air in an air mixer (not shown). A second portion of used cabin air is drawn from a top of cabin 14 through the ceiling into upper ducting 20. This second portion of used cabin air is sent through upper ducting 20 to heat exchanger 12 in the crown 18 of the aircraft 10.

Heat exchanger 12 comprises a liquid-to-air type device which cools the second portion of relatively warm air from the cabin 14 as it passes through upper ducting 20. Upper ducting 20 then directs conditioned recirculation air from heat exchanger 12 to cabin 14 for re-use by passengers.

By utilizing liquid-to-air heat exchanger 12, recirculation air can be conditioned down to cooler temperatures than those achieved with traditional air-to-air heat exchanger disposed at a distance from the cabin 14 outside the pressure vessel of the aircraft 10. Additionally, disposing liquid-to-air heat exchanger 12 in crown 18 allows for direct communication with upper ducting 20 and eliminates the need for additional ducting.

Figure 2A:
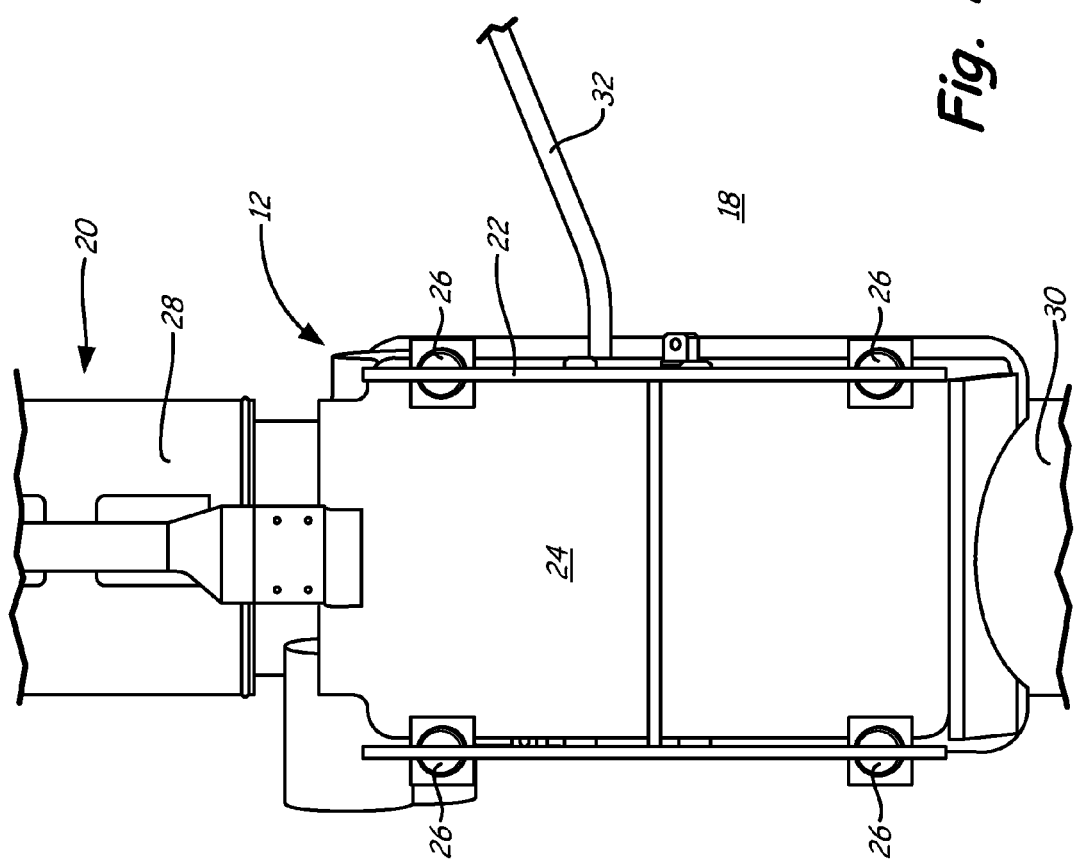
FIG. 2A is a top view of the heat exchanger and connected ducting.

FIG. 2A shows a top of heat exchanger 12 and upper ducting 20. Heat exchanger 12 is supported within crown 18 by a bracket 22. Heat exchanger 12 includes an air inlet header 24 with mounting pads 26. Upper ducting 20 includes an air inlet connection fan 28 and an air outlet connection duct 30. A drain tube 32 communicates with heat exchanger 12.

Bracket 22 is illustrated in FIG. 2A as having an H shape and is designed to support heat exchanger 12 from above. More particularly, bracket 22 is connected to mounting pads 26 of air inlet header 24. Mounting pads 26 attach with bolts (not shown) to bracket 22. Air inlet header 24 comprises the upper portion of heat exchanger 12. Heat exchanger 12 is connected in fluid communication with air inlet connection fan 28 and air outlet connection duct 30. Drain tube 32 connects to heat exchanger 12 and transports water condensate away from a lower portion of heat exchanger 12 to bilge in a lower portion of aircraft 10 (FIG. 1).

Bracket 22 eliminates the need for tie rods or other complicated brackets. Air inlet connection fan 28 circulates recirculation air into air inlet header 24 which directs the air to a core (FIG. 2B) of heat exchanger 12. After air is conditioned by the core, the air passes from heat exchanger 12 to air outlet connection duct 30 of upper ducting 20 for re-use in cabin 14 (FIG. 1).

FIG. 2B shows a side view of heat exchanger 12. In addition to air inlet header 24 and mounting pads 26, heat exchanger 12 includes a core 36 and an air outlet header 38. Air inlet header 24 includes an air inlet connection 40 having centerline 41. Air outlet header 38 includes an air outlet connection 42 having centerline 43 and a condensate collection trough 44. Core 36 includes a liquid inlet port 46, a liquid outlet port 48, a leading surface 50, and a trailing surface 52 with a cold-cold portion 54.

In the embodiment shown in FIG. 2B, core 36 is of a two-pass cross flow plate fin construction. Air inlet header 24 forms air inlet connection 40 through which air flow passes to enter heat exchanger 12. Air outlet header 38 forms air outlet connection 42 through which air flow passes to exit heater exchanger 12. Core 36 is connected between air inlet header 24 and air outlet header 38 and is angled relative to the direction of air flow and both air inlet connection 40 and air outlet connection 42. Core 36 is disposed at an obtuse first angle a to air flow entering air inlet header 24 through air inlet connection 40. Similarly, core 36 is disposed at an acute second angle β to air flow exiting air outlet header 38 via air outlet connection 42. In the embodiment shown in FIG. 2B, first angle α and second angle β comprise supplementary angles and add to substantially 180°. In other embodiments, core 36 can be angled at various angles relative to the direction of air flow, air inlet connection 40, and air outlet connection 42.

Air inlet connection 40 does not align in a straight flow path with air outlet connection 42 in the embodiment shown in FIG. 2B. Air outlet header 38 comprises a lowest most portion of heat exchanger 12. The bottom of air outlet header 38 is shaped to form condensate collection trough 44.

A liquid header is removed in FIG. 2B to show liquid inlet port 46 and liquid outlet port 48. Due to the two-pass construction of the embodiment shown in FIG. 2B, liquid inlet port 46 is disposed on a same lowermost end of core 36 as liquid outlet port 48. Leading surface 50 is disposed to interface with air flow passing through air inlet header 24. Trailing surface 52 is disposed substantially parallel to leading surface 50 and comprises the opposing surface of core 36 therefrom.

Core 36 is configured to allow air flow to pass therethrough and core 36 has sufficient surface area such that air flow leaves core 36 to enter air outlet header 38 at a velocity of less than about 10 ft/sec (3.05 m/sec). Because liquid inlet port 46 is disposed at a lowermost end of core 36, cold-cold portion 54 of core 36 occurs on trailing surface 52 immediately adjacent air outlet header 38. Cold-cold portion 54 is offset from the air inlet connection 40 so as not to be in the direct flow path of air entering heat exchanger 12.

Air inlet header 24 directs air flow from duct 20 (FIG. 1) to core 36. Core 36 circulates cooling liquid (e.g., a coolant), which conditions the air flow as the air passes through core 36. Air flow is directed out of the heat exchanger 12 by air outlet header 38. Water condensate tends to collect on cold-cold portion 54, the coldest portion of core 36. The configuration of core 36 reduces the velocity of the air flow leaving core 36. This reduced velocity allows water to condense out of the air. The design of core 36 allows the water condensate to easily flow down into air outlet header 38 and collect in collection trough 44. From collection trough 44 the water is transported away from heat exchanger 12 by drain tube 32 (FIG. 2A).

The foregoing design allows water condensate to coalesce from air flow within liquid-to-air heat exchanger 12 and be effectively collected by air outlet header 38 and removed from liquid-to-air heat exchanger 12 in crown 18 (FIG. 1), thereby minimizing the risk of free moisture in ducting 20 (FIG. 1) of aircraft 10. By utilizing liquid-to-air heat exchanger 12, recirculation air can be conditioned down to cooler temperatures than those achieved with traditional air-to-air heat exchanger(s) that must be disposed at a distance from the cabin outside the pressure vessel of the aircraft. Additionally, disposing liquid-to-air heat exchanger 12 in crown 18 allows for direct communication with upper ducting 20 and eliminates the need for additional ducting.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A liquid-to-air heat exchanger comprising:
an air inlet header having an air inlet connection, wherein the air inlet connection defines an inlet cross-sectional flow area;
an air outlet header having an air outlet connection and a trough, wherein the air outlet connection defines an outlet cross-sectional flow area, wherein the centerline of the air inlet connection and the centerline of the air outlet connection each passes through the respective geometric center of the inlet and outlet cross-sectional flow areas;
a liquid-to-air heat exchanger core connected to the air inlet header and the air outlet header, wherein the portion of the leading surface of the core that is furthest away from the liquid outlet port is disposed at a first obtuse angle relative to the centerline of the air inlet connection, and wherein the portion of the trailing surface of the core that is furthest away from the liquid inlet port is disposed at a second acute angle relative to the centerline of the air outlet connection;
a liquid inlet port connected to an end of the core adjacent to a trailing surface of the core;
a liquid outlet port connected to an end of the core adjacent to the leading surface of the core and the liquid inlet port, wherein a portion of the trailing surface of the core immediately adjacent the liquid inlet port faces towards the trough, and wherein the trough is configured to collect water from air that has passed through the core.

2. The heat exchanger of claim 1, wherein the centerlines of the air inlet connection and the air outlet connection are parallel and offset.

3. The heat exchanger of claim 1, wherein the air flow leaves the core at a velocity of less than or equal to 3.05 m/sec.

4. The heat exchanger of claim 1, wherein the core has a two-pass cross flow plate fin construction.

5. The heat exchanger of claim 1, wherein the air inlet header has mounting pads for mounting the heat exchanger within a crown of an aircraft.

6. The heat exchanger of claim 5, further comprising an H shaped bracket that connects to the mounting pads.

* * * * *